United States Patent
Gogolla et al.

(10) Patent No.: US 8,767,191 B2
(45) Date of Patent: Jul. 1, 2014

(54) DISTANCE-MEASURING DEVICE AND SURVEYING SYSTEM

(75) Inventors: Torsten Gogolla, Schaan (LI); Stefan Tiefenthaler, Meiningen (AT)

(73) Assignee: Hilti Aktiengesellschaft, Schaan (LI)

( * ) Notice: Subject to any disclaimer, the term of this patent is extended or adjusted under 35 U.S.C. 154(b) by 107 days.

(21) Appl. No.: 13/306,204

(22) Filed: Nov. 29, 2011

(65) Prior Publication Data

US 2012/0133919 A1    May 31, 2012

(30) Foreign Application Priority Data

Nov. 30, 2010   (DE) .......................... 10 2010 062 172

(51) Int. Cl.
   *G01C 3/08*   (2006.01)

(52) U.S. Cl.
   USPC .......... 356/5.01; 356/3.01; 356/4.01; 356/5.1

(58) Field of Classification Search
   USPC ............. 356/3.01–3.15, 4.01–4.1, 5.01–5.15, 356/6–22, 28, 28.5
   See application file for complete search history.

(56) References Cited

U.S. PATENT DOCUMENTS

| | | | | |
|---|---|---|---|---|
| 5,918,960 A * | 7/1999 | Hopwood et al. | ............... | 356/71 |
| 6,603,534 B2 | 8/2003 | Seifert et al. | .................. | 356/4.01 |
| 6,917,415 B2 | 7/2005 | Gogolla et al. | .............. | 356/5.06 |
| 7,142,288 B2 | 11/2006 | Stierle et al. | .................. | 359/4.01 |
| 7,221,435 B2 | 5/2007 | Stierle et al. | .................. | 356/4.01 |
| 7,324,218 B2 | 1/2008 | Stierle et al. | .................. | 356/614 |
| 2004/0051865 A1 | 3/2004 | Stierle et al. | | |
| 2005/0151957 A1* | 7/2005 | Stierle et al. | .................. | 356/5.15 |
| 2005/0280802 A1 | 12/2005 | Liu | | |
| 2006/0225296 A1* | 10/2006 | Schulte | ...................... | 33/501.06 |
| 2007/0206174 A1 | 9/2007 | Boegel et al. | | |

FOREIGN PATENT DOCUMENTS

| | | |
|---|---|---|
| DE | 101 12 833 C1 | 3/2003 |
| DE | 101 49 144 C1 | 4/2003 |
| DE | 101 57 378 A1 | 6/2003 |
| DE | 102 32 878 A1 | 2/2004 |
| DE | 102 39 435 B4 | 3/2004 |
| DE | 102 39 435 B4 | 3/2005 |
| DE | 100 51 302 | 4/2005 |
| DE | 202010017059 U1 | 4/2011 |

* cited by examiner

*Primary Examiner* — Luke Ratcliffe
(74) *Attorney, Agent, or Firm* — Davidson, Davidson & Kappel, LLC

(57) ABSTRACT

A distance-measuring device for the contactless measurement of the distance to a target, including a housing; a measuring apparatus which utilizes an optical measuring beam, which is arranged in a housing, and by which the distance to the target can be measured contactlessly; at least one reference stop arranged on the housing and that can be selected by the user in order to carry out the measurement; an operating and input array arranged on the housing and serving to operate at least one measuring apparatus; a visual display arranged on the housing and coupled to the operating and input array to indicate an operating state and/or the measured distance from a selected reference stop to the target. The housing has at least one optical signaler separate from the visual display and unambiguously associated with a reference stop and being activatable whenever that reference stop is selected.

16 Claims, 4 Drawing Sheets

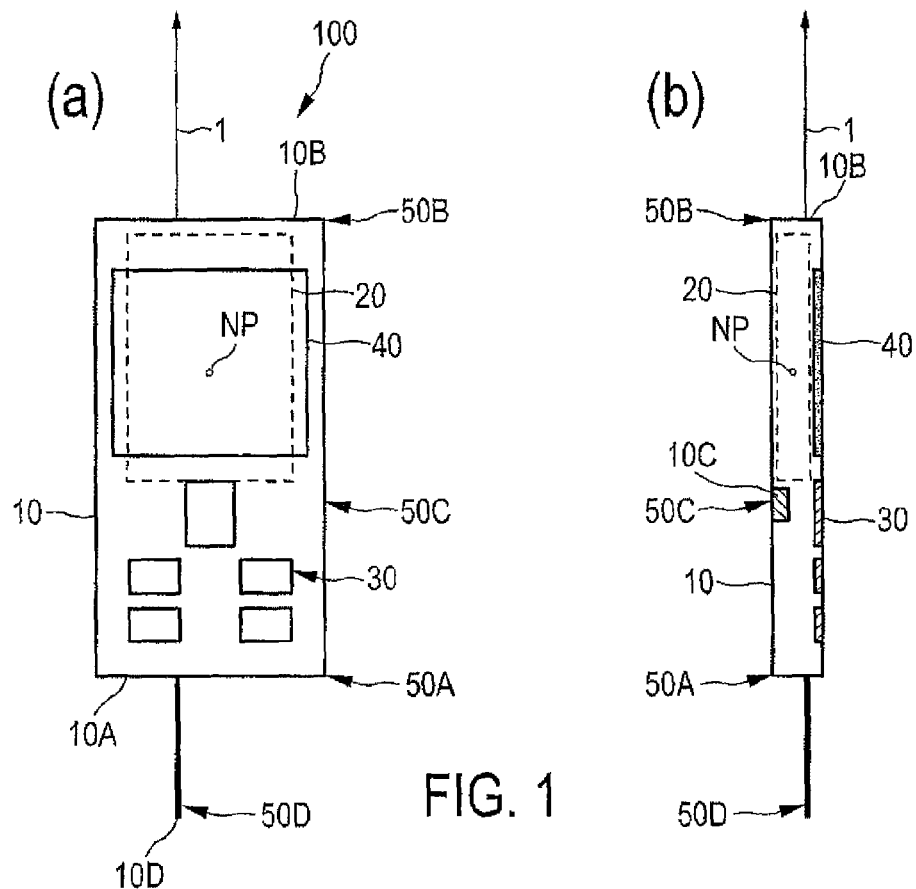
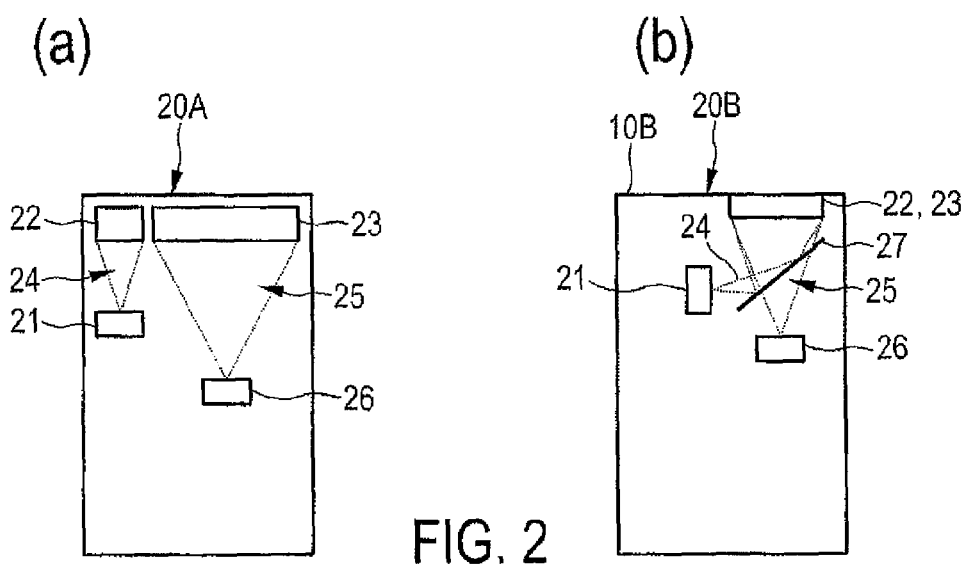
FIG. 1
FIG. 2

DISTANCE-MEASURING DEVICE AND SURVEYING SYSTEM

This claims the benefit of German Patent Application DE 10 2010 062 172.2, filed Nov. 30, 2010 and hereby incorporated by reference herein.

The present invention relates to a distance-measuring device, especially in the form of a handheld device, for the contactless measurement of the distance to a target.

BACKGROUND

Distance-measuring devices of the above-mentioned type serve to measure distance employing optical means. Distance-measuring methods are generally known which, for example, make use of the runtime of a light-modulation signal that is configured, for instance, as a light pulse, a sinusoidal wave or a pseudo noise, and/or the phasing of a coherent optical beam of the type generated, for instance, by a laser. Likewise known is the familiar method of laser triangulation. These methods can be employed for distance measurement on an as-needed basis. For this purpose, the distance-measuring device provides for an appropriately configured measuring apparatus that is arranged in the housing and that makes use of an optical measuring beam by means of which the distance to the target point can be measured contactlessly. Thus, for instance, German revised patent DE 100 51 302 CS or German patent specification DE 101 12 833 C1 disclose the configuration of a suitable measuring apparatus.

A distance-measuring device of the above-mentioned type can be especially advantageously provided in the form of a handheld device in which the housing is configured for handheld use, especially in terms of its shaping, dimensions and the like. Fundamentally speaking, the distance measured to a target is determined with reference to a housing-internal reference zero point. The distance-measuring device, however, is handled in such a way that the user places the housing or an extension thereof against an object, for example, against a wall or on the ground, whose distance to the target is to be measured. For this purpose, the housing has at least one reference stop that can be selected by the user in order to carry out the measurement. Such a reference stop can be an integral part of the housing, or else it is connected to the housing as a housing extension, or it can be connected to the housing for example, as a tripod. The reference stop can be selected by the user by activating, pulling out or attaching the housing extension on the housing. If applicable, a reference stop can also be operated by means of an operating and input array arranged on the housing. An operating and input array can be configured, for example, in the form of a keypad or the like. Through such a selection by the user, a fixed addition constant that is decisive for the reference stop is added to the distance between the reference zero point and the target so that the correct distance between the object and the target can be displayed to the user once the distance has been measured. The measured distance is normally shown on a visual display. The visual display is usually also coupled to the operating and input array in order to indicate an operating state of the distance-measuring device or the like on the visual display.

In the state of the art, there are various approaches aimed at increasing the basic measuring accuracy of such distance-measuring devices of the above-mentioned type. For instance, German patent application DE 101 57 378 A1 discloses a distance-measuring device in which a temperature-related curvature of the housing is compensated for by deflecting the transmitting and receiving path of the distance-measuring device. German patent application DE 102 32 878 A1 shows a distance-measuring device in which distances with predefinable measuring uncertainties can be measured in that a distance-dependent measuring uncertainty is stored as data in a storage medium, for example, in the form of a characteristic.

Aside from such device-related measuring uncertainties, however, the greatest risk of errors arises when a distance-measuring device is inadvertently handled incorrectly. For instance, German patent DE 102 39 435 B4 discloses a distance-measuring device in which an operating unit that serves for emitting an optical signal allows the light source of the measuring device to be switched on and off.

SUMMARY OF THE INVENTION

It is desirable to put forward a distance-measuring device that brings about an improvement in terms of the measuring uncertainty.

It is an object of the present invention to provide a distance-measuring device that can achieve an improvement in the measuring certainty. In particular, the distance-measuring device should more effectively be able to prevent user errors and thus improve the measuring certainty. In particular, there should be an improvement in the measuring certainty with respect to a reference stop that can be selected by the user.

The present invention provides a distance-measuring device. According to the present invention, it is provided that the housing has at least one optical signal means or signaler that is separate from the visual display, said signaler being unambiguously associated with a reference stop and being activated when that reference stop is selected.

The present invention is based on the consideration that, in all of the concepts known so far, the device does not adequately display the reference stop that has been selected by the user, that is to say, the device either does not display the selected reference stop at all or else only in the visual display that is associated with the operating and input array. This can be, for example, a symbolic or stylized image of the distance-measuring device and a matching image of the selected reference stop in the visual display. The invention has recognized that such a display in the visual display of the reference stop is not sufficient and that it therefore entails a high degree of measuring uncertainty. The invention has recognized that such a display is too small and/or too complex to be adequately recognized by the user, who is often rushed for time and is handling the distance-measuring device in a hurry. Especially in the case of relatively small images in monochromatic visual displays of the distance-measuring device, it turns out that there is a relatively great risk that the user will inadvertently select the wrong reference stop. The expression "inadvertently select the wrong reference stop" should especially be understood to mean that a user selects a given reference stop—for instance, by means of the operating and input array—but then uses a reference stop that is not the selected one. Such an unintentional selection of the wrong reference stop ultimately leads to an incorrect measuring reference in terms of the reference zero point of the distance-measuring device. This can directly give rise to incorrect measurements involving errors of more than 10 cm. In other words, even though the measurement relative to the reference zero point of the distance-measuring device as such is relatively precise, due to the selection of the incorrect addition constant, the distance to the target is displayed with a relatively large and thus, at times, critical error magnitude.

The invention has recognized that it is particularly advantageous for the selected reference stop to be displayed to the user, and this ultimately translates into an improvement in the measuring certainty. This is especially true of distance-measuring devices that have several reference stops that can be selected by the user. For instance, there is a relatively important reference stop on the rear of the housing of the distance-measuring device. Moreover, however, it is often the case that users are offered other reference stops on other sides of the housing or on a measuring extension connected to the housing or on a fastening means for a tripod. The concept of the invention also entails an improvement for a distance-measuring device having only one single reference stop. In any case, the reference stop selected by the user is clearly and unambiguously indicated to the user in activated form by the optical signal means configured separately from the visual display, indicating that a reference stop has been selected and indicating which reference stop has been selected. Consequently, even if the user is handling the distance-measuring device in a hurry, the user is capable of quickly ascertaining which reference stop has been selected. Therefore, whenever necessary, a user can make a correction or, at the very least, ensure that the reference stop selected by the user is, in fact, placed on the object for purposes measuring the distance from the object to a target. The risk that the user will use a reference stop that has not been selected and that is thus incorrect is largely avoided.

Within the scope of an especially preferred refinement, the position of the reference stop and the configuration of an associated optical signal means on the housing correlate in a predetermined manner in such a way that a user immediately associates the position of the reference stop with the appertaining signal means. In other words, the signal means is configured in such a way that it provides the user with an indication of the position of the reference stop. The advantage entailed by an optical signal means that is clear to the user and that can be associated with the position of the reference stop—separately from the visual display of the housing—is that the distance-measuring device can be handled practically intuitively. A major error source that would be very likely to occur is practically completely ruled out. Especially advantageously, the position of the reference stop and the place of the associated optical signal means on the housing are predetermined and correlated in such a way that the position of the reference stop can be associated with the place of the associated optical signal means. In particular, the place of the associated activated optical signal means is closer to the position of the selected reference stop than to the position of a reference stop that has not been selected. Advantageously, users can already see on the housing which reference stop they have selected. Advantageously, a user is capable of intuitively placing the housing on an object with the reference stop that is closest to the place of the optical signal means. For instance, in a particularly advantageous manner, the optical signal means can be activated directly on or congruently with the selected reference stop.

A refinement that has proven to be particularly advantageous is one in which the housing has a number of reference stops that can be selected by the user for the measurement as well as a number of individual optical signal means. Advantageously, each of the individual optical means is separately and unambiguously associated with an individual reference stop. In this refinement, it is prevented that the wrong reference stop is selected, or else it is prevented that the reference stop actually used to measure the distance to the target is not the one that was selected by the user.

Advantageously, the number of reference stops especially encompasses a reference stop that is an integral part of the housing. This can especially be a rear reference stop that is arranged on the rear of the housing. In addition or as an alternative, these could also be one or more additional reference stops such as, for instance, a side reference stop, a front reference stop, a top or bottom reference stop, or an extensible or fold-out reference stop. The expression "reference stop connected to the housing" refers to any reference stop that is not an integral part of the housing. This can be, for example, a reference stop that is arranged on a measuring extension that is connected to the housing. This can also be a reference stop that is arranged on a tripod connected to the housing. This especially includes the position of a tripod screw or a tripod attachment on the housing. Moreover, other reference stops can be provided with which an individual optical signal means is separately associated.

In a particularly preferred manner, the optical signal means is in the form of a light source such as a light diode, a signal lamp or the like. The light source is especially configured to emit a light signal. The light signal does not have to be emitted continuously, but rather, can also be emitted in a blinking pattern or with different levels of intensity. Such and other measures regarding the light source markedly increase the visibility of the optical signal means for a user.

Furthermore, the configuration of the associated optical signal means on the housing can advantageously comprise one or more additional designs. Thus, for instance, the color or size of the signal means can be suitably selected to provide the user with an association with the selected reference stop. This also includes especially the shape of the optical signal means which can be provided, for example, with a directional indicator, for instance, in the form of an arrow or the like, in order to call attention to the selected reference stop.

In an especially preferred refinement, the measuring apparatus that utilizes the optical measuring beam is configured to detect the distance to a target on the basis of a runtime measurement. Preferably, the measuring apparatus has a laser unit and a transmitting and receiving lens system. The transmitting lens system is preferably associated with an optical transmitting path having an optical axis for purposes of emitting the measuring beam onto the target. The receiving lens system is preferably associated with an optical receiving path having an optical axis for purposes of receiving the measuring beam that is reflected by the target.

BRIEF DESCRIPTION OF THE DRAWINGS

Embodiments of the invention will be described below on the basis of the drawing. The drawing does not necessarily depict the embodiments true-to-scale, but rather, the drawing is presented in schematic and/or slightly distorted form whenever necessary for the sake of clarity. Regarding additions to the teaching that can be gleaned directly from the drawing, reference is hereby made to the pertinent state of the art. In this context, it should be taken into account that a wide array of modifications and changes pertaining to the shape and the detail of an embodiment can be made, without deviating from the general idea of the invention. The features of the invention disclosed in the description, in the drawing as well as in the claims, either on their own or in any desired combination, can be essential for the refinement of the invention. Moreover, all combinations of at least two of the features disclosed in the description, in the drawing and/or in the claims fall within the scope of the invention. The general idea of the invention is not limited to the exact shape or details of the preferred embodiment shown and described below, nor is it limited to an object that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or similar function.

Additional advantages, features and details of the invention ensue from the description below of preferred embodiments as well as from the drawing; this shows the following:

FIG. 1: a schematic view of a distance-measuring device according to a preferred embodiment, for purposes of explaining the fundamental mode of operation, in a front view (a) and in a side view (b);

FIG. 2: two especially preferred variants of the distance-measuring device of FIG. 1, with a biaxial measuring apparatus (a) and with a coaxial measuring apparatus (b);

DETAILED DESCRIPTION

Figure 3:
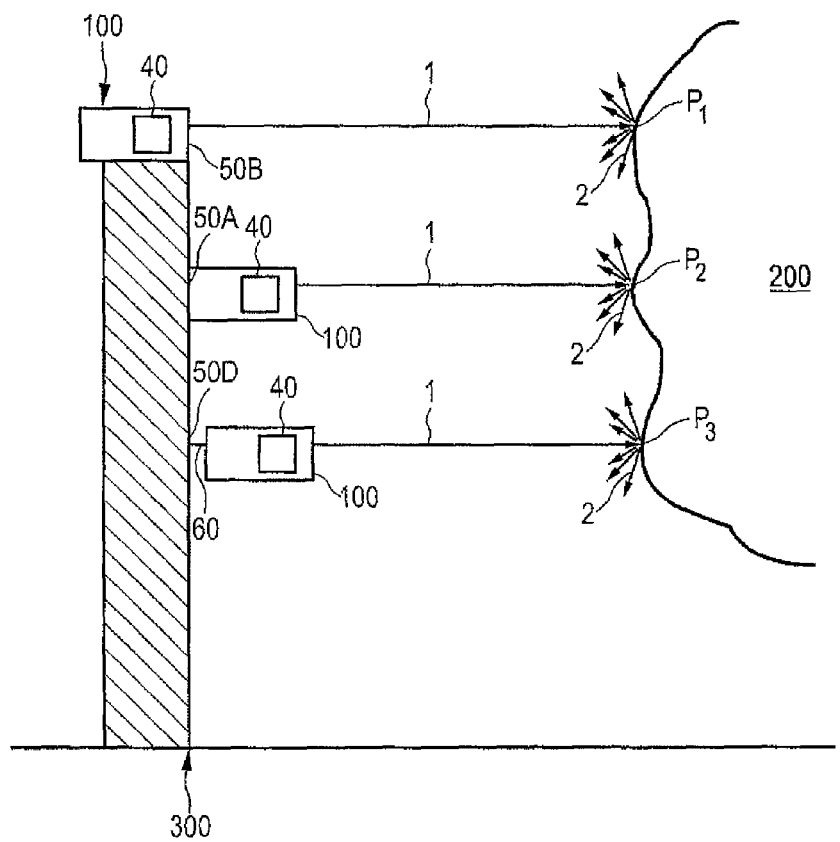
FIG. 3: a combined view of three different measuring scenarios with the distance-measuring device of FIG. 1 and employing different reference stops on the housing of the distance-measuring device.

FIG. 1 shows a distance-measuring device 100 in the form of a handheld device for the contactless measurement of the distance to a target, whereby the distance-measuring device 100 is shown on the left-hand side of view (a) in a front view on the operating side of the housing 10, and on the right-hand side of view (b) in a side view of the housing 10; the components of the distance-measuring device 100 are schematically shown.

The distance-measuring device 100, which can also be referred to as a handheld laser distance-measuring device, has a housing 10 that is configured to allow handheld use; here, it is only slightly larger than the palm of a hand and it has good handling characteristics and ergonomics; however, for the sake of simplicity, the housing 10 is shown here with a rectangular shape. A measuring apparatus 20 that uses an optical measuring beam 1 and that can also be referred to as a laser distance-measuring device is accommodated in the housing 10, and this is shown by a dotted line. Conceivable variants of the measuring apparatus 20 are shown in FIGS. 2(a) and 2(b). Different handling scenarios for the contactless measurement of the distance to a target are shown in greater detail in FIG. 3.

The distance-measuring device 100 also has an operating and input array 30 arranged on the housing 10 that is configured here as a keypad embedded in the operating side of the housing 10. A visual display 40 is also embedded in the operating side of the housing 10 and this is where the measured distance from a target as well as the operating status of the distance-measuring device 100 can be displayed. The operating and input array 30 can be used to operate the measuring apparatus 20, and also to select one of the reference stops of the housing 10—which will be explained below. Whereas the measurement employing an optical measuring beam 1—here a laser beam, for example—relates to a housing-internal reference zero point NP, a user will often want to measure the distance to the target relative to one of the reference stops 50A, 50B, 50C or 50D, which are explained in greater detail with reference to FIGS. 3 to 5 and which have already been partially shown in FIG. 1. In other words, once the user selects a reference stop 50A to 50D on one of the sides 10A to 10C of the housing 10 or on a tip 10D of a measuring extension, for instance, by activating it or by using the operating and input array 30 to make the selection, the distance-measuring device 100 is provided with a fixed addition constant that is related to the selected reference stop, that is to say, here one of the reference stops 50A to 50D. The values of the addition constants associated with the reference stops 50A to 50D differ from each other by up to 10 cm or more, depending on the distance of a stop edge of the reference stop 50A to 50D to the reference zero point NP of the distance-measuring device 100. A relatively large measuring uncertainty is avoided by the present embodiment of the distance-measuring device 100 in that an optical signal means—explained with reference to FIGS. 4 and 5—clearly indicates to the users which of the reference stops 50A to 50D they have selected. Consequently, it is ensured that the reference stop selected by the user to measure the distance to a target is indeed the one being used. Once this has been ensured, the distance of the reference stop 50A to 50D to the target 200, that is to say, the distance from the reference zero point NP to the target 200 is correctly displayed along with the correct addition constant.

Thus, in the depiction in the middle, FIG. 3 shows the use of the distance-measuring device 100 with the most important reference stop, namely, the rear reference stop 50A on an external reference surface 300 of an object in order to measure the distance to the measured object 200 by means of the optical measuring beam 1. The distance between a measuring point $P_2$ of the measured object 200 and the reference zero point NP of the distance-measuring device 100 is determined here by means of the measuring apparatus 20. Subsequently, the distance between an external reference surface 300 and the measuring point $P_2$ is displayed, along with the selection of the correct addition constant, namely, with the selection of the addition constant associated with the reference stop 50A.

In the situation shown at the top of FIG. 3, the distance to a measuring point $P_1$ of the measured object 200 is measured with the measuring beam 1 by means of the measuring apparatus 20. The measurement, once again, is carried out with respect to the external reference surface 300 of the object, but this time employing a front reference stop 50B of the distance-measuring device 100. In other words, in this case, the distance between the measuring point $P_1$ of the target 200 and a reference zero point NP of the device 100 is determined and then displayed to the user with the correct addition constant, that is to say, using the addition constant associated with the reference stop 50B.

In the situation shown at the bottom of FIG. 3, the distance to a measuring point $P_3$ of the target 200 is measured with the measuring beam 1, once again, relative to the external reference surface 300 of the object. The only difference from the two previously explained situations is that this time, the distance is measured relative to a reference stop 50D that is connected to a measuring extension 60 of the housing 10. Thus, in this case, the addition constant associated with the reference stop 50D is used to display the distance in the visual display 40 of the distance-measuring device 100 in order to display the correct distance to the user. The measuring extension 60 can be configured in many different ways so that it can be folded out, pulled out or screwed on. The expression "measuring extension 60" fundamentally also applies to a tripod as is schematically shown in FIG. 1 and as can be seen by way of an example from the additional explanation of FIGS. 4 and 5 below. In a variant not shown here, a distance-measuring device 100 can have a tripod thread shown in FIG. 1 whose mid-point can serve as the reference stop 50C, for instance, in the manner shown in FIG. 4(c).

The methods elaborated upon above can be employed in order to determine the distance between a target 200 and the reference zero point NP of the measuring device 100. Here, the distance-measuring device 100 has a measuring apparatus 20 that utilizes an optical measuring beam 1 and that is based on a runtime measurement. Two variants of the measuring apparatus 20A, 20B, of the type that can be employed for a measuring apparatus 20 are shown by way of an example in FIGS. 2(a) and 2(b). Both measuring apparatuses 20A, 20B have a laser unit 21, for instance, a laser diode, as well as a transmitting lens system 22 and a receiving lens system 23. The measuring apparatus 20A, 20B also has an optical transmitting path 24 with an optical axis for purposes of emitting a measuring beam 1 onto the target 200. Moreover, the measuring apparatus 20A, 20B has an optical receiving path 25 that has an optical axis for purposes of receiving a measuring beam 2 that is reflected and/or scattered by the target 200, as is shown in FIG. 3. A detector 26 that serves to detect a reflected and/or scattered measuring beam 2 is arranged in the receiving path 25. In both types of measuring apparatuses 20A, 20B, the receiving lens system 23 serves to focus the reflecting and/or scattered measuring beam 2 onto the detector 26, for instance, a photodiode. The measuring apparatus 20A is configured in FIG. 2(a) with a separate transmitting lens system 22 and receiving lens system 23, so that the transmitting path 24 and the receiving path 25 do not overlap. This arrangement of the paths 24, in the measuring apparatus 20A is also referred to as a biaxial arrangement. In contrast to this, the measuring apparatus 20B is configured with a coaxial arrangement of the paths 24, 25, whereby the transmitting path 24 and the receiving path 25 are combined by means of a beam splitter 27, and they overlap in the two shared transmitting and receiving lens systems 22, 23. The transmitting path 24 and the receiving path 25, in turn, run separately in the area between the laser unit 21 and the beam splitter 27 or between the detector 26 and the beam splitter 27.

Concretely speaking, with the measuring apparatus 20A, 20B that is configured as a laser distance-measuring unit, the measuring beam 1 from a laser unit 21 in the form of a laser diode is bundled by means of an optical lens of the transmitting lens system 22. The bundled measuring beam 1 comes from the front 1013 of the housing as is shown in FIG. 1, and is aimed at the target 200—for instance, a measuring point $P_1$, $P_2$, $P_3$ there—and it forms a light spot on the measuring point $P_1$, $P_2$, $P_3$. The reflected and/or scattered measuring beam 2 is imaged onto the active surface of a photodiode of the detector 26 by means of an optical lens of the receiving lens system 23 in the manner explained. The measuring apparatus 20A here can be configured biaxially or, as in the case of the measuring apparatus 20B, coaxially. For purposes of determining the distance from the target 200 to the reference zero point NP of the measuring device 100—along the back and forth paths— the measuring beam 1, here laser light, is modulated. The modulation can be carried out in the form of a pulse or in sinusoidal form. The modulation is carried out in such a manner that the time differential between a transmitted and a received measuring-beam modulation can be measured. Consequently, the light speed factor can provide information about the simple distance between the reference zero point NP of the measuring device 100 and the target 200. This can be calculated, for example, in a control unit (not shown here).

In most cases, in order to measure a distance, the rear 10A of the housing of the distance-measuring device 200, using the reference stop 50A, is placed on the reference surface 300 of an object, for instance, a wall, a floor or the like, as shown in the middle depiction in FIG. 3. Therefore, the rear 10A of the housing comprises the rear reference stop 50A. Once it has been set, all of the subsequently measured distances to a target 200 then relate to this reference stop 50A. Once a user has set such a reference stop 50A, for instance, by means of the operating and input array 30, in the control unit explained above, the addition constant associated with this reference stop 50A is added to the measured distance of the reference zero point NP and the corresponding distance is displayed in the visual display 40.

Figure 4:
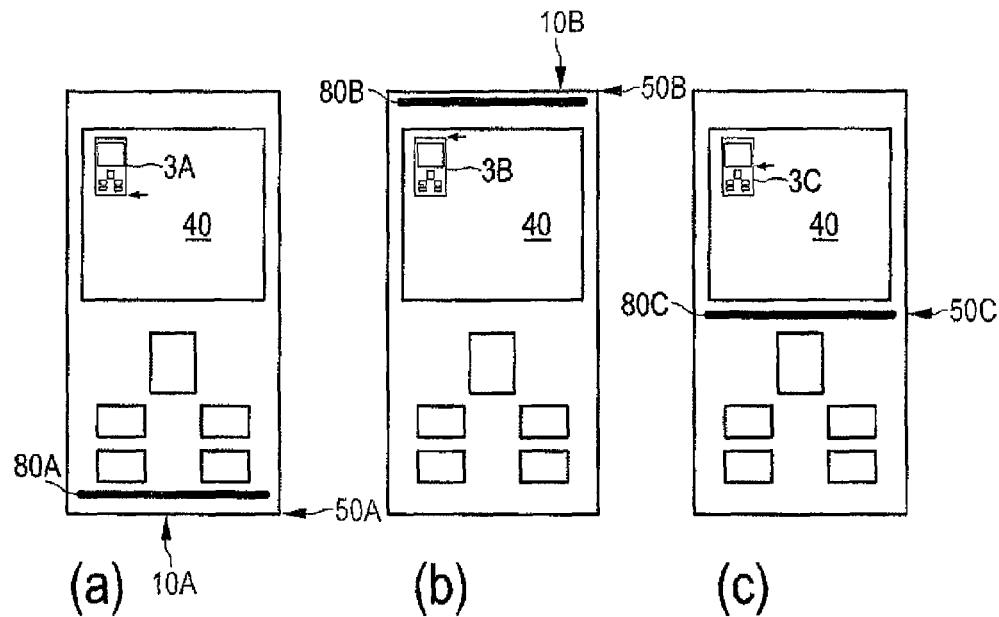
FIG. 4: in views (a) to (e), five different operating situations of a distance-measuring device, each involving a differently selected reference stop and thus differently associated optical signal means, whereby the optical signal means is configured here in the form of an illuminated field created by a light diode.
Figure 4:
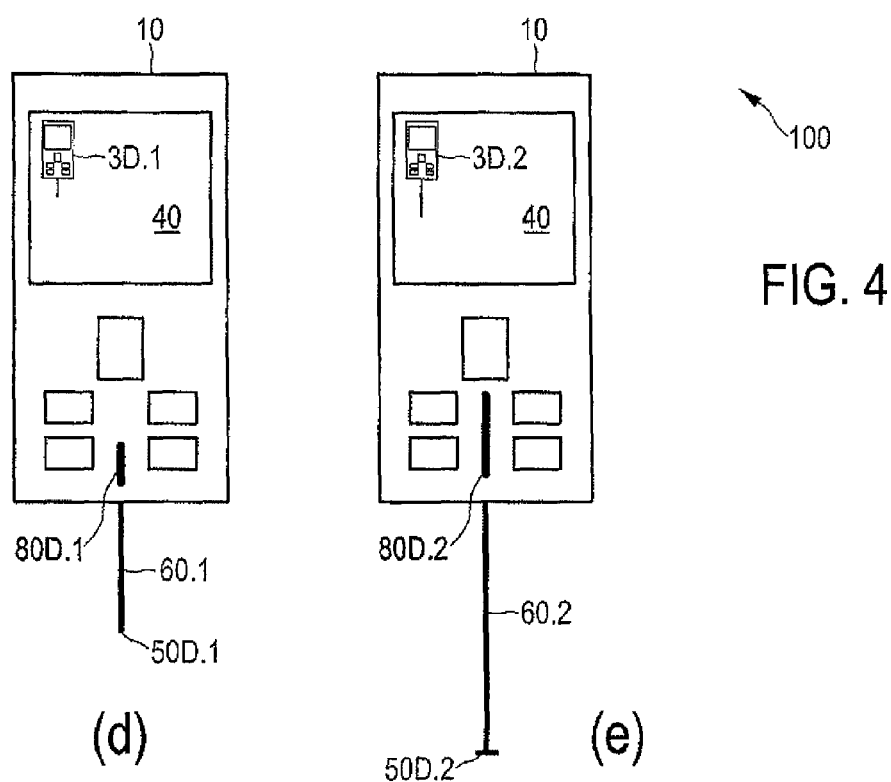

In accordance with the concept of the invention, the distance-measuring device 100—as shown in views (a) to (e) of FIG. 4—have a number of reference stops 50A, 50B, 50C, 50D.1 and 50D.2 that can be selected by the user for the measurement. Moreover, the distance-measuring device 100 has a number of individual optical signal means 80A, 80B, 80C, 80D.1 and 80D.2. Each individual reference stop 50A, 50B, 50C, 50D.1 and 50D.2 is separately and unambiguously associated with one of the individual optical signal means 80A, 80B, 80C, 80D.1 and 80D.2, whereby each of these is formed separately from the visual display 40. The reference stop that has been selected in each specific case is shown in the visual display 40 by a symbol 3A, 3B, 3C, 3D.1 and 3D.2, as can be seen in FIGS. 4(a) to (e). In accordance with the concept of the invention, however, this is superfluous and can be dispensed with. In the present embodiment of a distance-measuring device 100, the optical signal means 80A to 80D.2 makes it very clear to the user which one of the reference stops 50A to 50D.2 has, in fact, been selected. The optical signal means 80A to 80D.2 are configured here in the form of illuminated fields having a bar-shaped light signal formed by means of an LED. The rear 10A of the housing has an optical signal means 80A associated with the rear reference stop 50A, as can be seen in FIG. 4(a). This optical signal means 80A is activated when the distance-measuring device 100 is used, as is shown in the middle part of FIG. 3. The front 10B of the housing of the distance-measuring device 100 has a front signal means 80B associated with the front reference stop 50B. The front signal means 80B is activated when the distance-measuring device 100 is used, as is shown in the upper view of FIG. 3. The corresponding depiction is FIG. 4(b).

As can be seen in FIG. 4(c), the housing 10 also has a middle, here a side, reference stop 50C that is configured as the mid-point of a tripod thread. An optical signal means 80C on the top of the housing is associated with the middle, here a side, reference stop 50C. The optical signal means 80C is activated whenever the reference stop 50C is used, that is to say, when the distance-measuring device 100 is screwed onto the tripod using the tripod thread.

As can be seen in FIG. 4(d), the housing 10 is provided with a first measuring extension 60.1, which has a first measuring stop 50D. As can be seen in FIG. 4(e), the housing 10 of the distance-measuring device 100 here also has a second housing extension 60.2 that is provided with a second measuring stop 50D.2. An optical signal means 80D.1 or 80D.2 oriented along the longer housing axis is associated with the measuring stops 50D.1, 50D.2.

Figure 5:
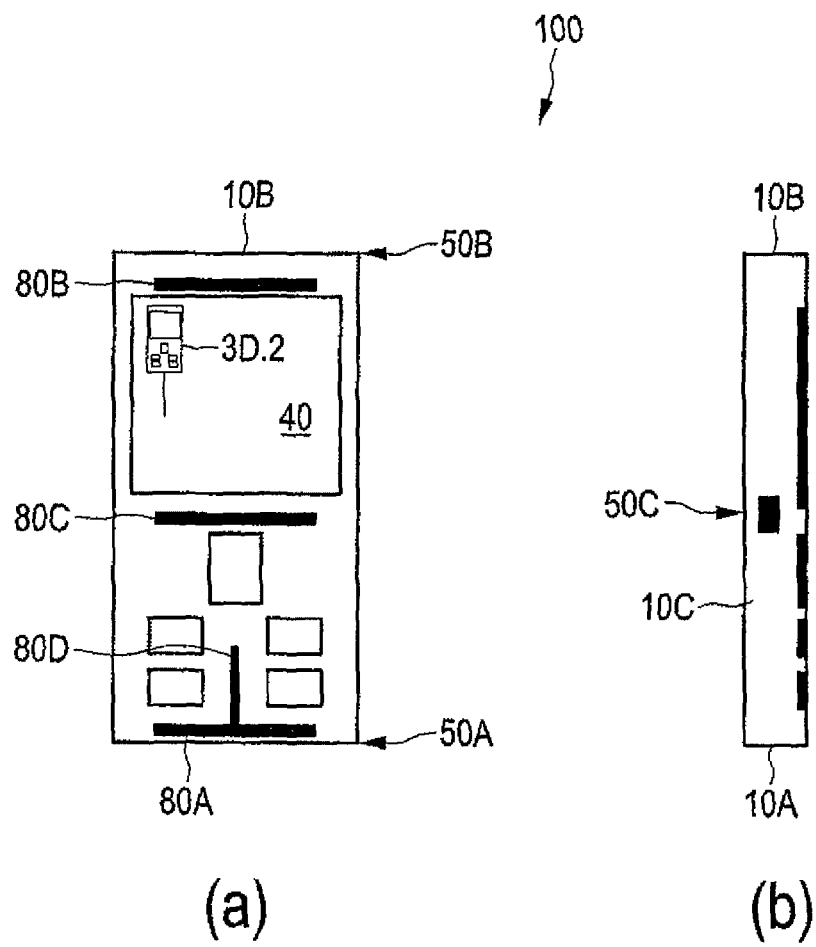
FIG. 5: the distance-measuring device from FIG. 4, showing all of the illuminated fields that create optical signal means and that are formed on the housing separately from the visual display, in a front view (a) and in a side view (b).

FIG. 5 shows the signal means 80A to 80D together with the reference stops 50A to 50D in a combined view. Views (a) through (e) each only show the signal means 80A to 80D that has been activated in each case, showing the way in which they are associated with the reference stops 50A to 50D selected in each case.

Altogether, it can be seen in the embodiment of the distance-measuring device 100 shown here that a position of the reference stop 50A to 50D and the placement of the associated optical signal means 80A to 80D on the housing 10 are correlated in a predetermined manner, namely, through a positional correlation. Here, the positional correlation, as can be seen in FIGS. 4 (*a*) through (*e*), is such that a place of the associated, activated optical signal means 80A, 80B, 80C on the housing 10 is closer to a position of the selected reference stop 50A to 50C than to a position of a reference stop that has not been selected. This means that, when the reference stop 50A is selected, only the optical signal means 80A is activated. When the reference stop 50B is selected, only the optical signal means 80B is activated. When the reference stop 50C is selected, only the optical signal means 80C is activated. This correlation also applies for the reference stop 50D and the associated optical signal means 80D. Moreover, the orientation of the optical signal means 50D differs from that of the optical signal means 80A to 80C. This intuitively shows to the user that now the measuring extension 60.1 or 60.2 forms the reference stop 50D.1 or 50D.2, insofar as the user has selected it. This can have been done by means of the operating and input array 30 or by pulling out, folding out or attaching the measuring extension 60.1 or 60.2.

The optical signal means 80A to 80D are not only associated with the position of a given reference stop 50A to 50D by means of their positional correlation, that is to say, placement on the housing 10. They can also have other associating configurations that indicate a selected reference stop 50A to 50D. For instance, this can refer to the size or the shape, for example, in the form of an arrow or symbol, of the optical signal means 80A to 80D.

What is claimed is:

1. A distance-measuring device for contactless measurement of a distance to a target, comprising:
   a housing;
   a measurer utilizing an optical measuring beam and arranged in the housing, the measurer capable of measuring the distance to the target contactlessly;
   at least one reference stop arranged on the housing and selectable by the user in order to carry out the measurement;
   an operating and input array arranged on the housing and serving to operate the measurer; and
   a visual display arranged on the housing and coupled to the operating and input array to indicate an operating state and/or the measured distance from a selected reference stop of the at least one reference stop to the target,
   the housing having at least one optical signaler separate from the visual display, the signaler being unambiguously associated with the reference stop and being activatable when the selected reference stop is selected;
   wherein a position of the reference stop and configuration of an associated optical signaler on the housing correlate in a predetermined manner in such a way that the position of the reference stop can be associated with the associated optical signaler.

2. A distance-measuring device for contactless measurement of a distance to a target, comprising:
   a housing;
   a measurer utilizing an optical measuring beam and arranged in the housing, the measurer capable of measuring the distance to the target contactlessly;
   at least one reference stop arranged on the housing and selectable by the user in order to carry out the measurement;
   an operating and input array arranged on the housing and serving to operate the measurer; and
   a visual display arranged on the housing and coupled to the operating and input array to indicate an operating state and/or the measured distance from a selected reference stop of the at least one reference stop to the target,
   the housing having at least one optical signaler separate from the visual display, the signaler being unambiguously associated with the reference stop and being activatable when the selected reference stop is selected;
   wherein a position of the reference stop and a place of the associated optical signaler on the housing are predetermined and correlated in such a way that the position can be associated with the place of the associated optical signaler.

3. The distance-measuring device as recited in claim 2 wherein the place of the associated activated optical signaler is closer to the position of the selected reference stop than to the position of a reference stop that has not been selected.

4. A distance-measuring device for contactless measurement of a distance to a target, comprising:
   a housing;
   a measurer utilizing an optical measuring beam and arranged in the housing, the measurer capable of measuring the distance to the target contactlessly;
   at least one reference stop arranged on the housing and selectable by the user in order to carry out the measurement;
   an operating and input array arranged on the housing and serving to operate the measurer; and
   a visual display arranged on the housing and coupled to the operating and input array to indicate an operating state and/or the measured distance from a selected reference stop of the at least one reference stop to the target,
   the housing having at least one optical signaler separate from the visual display, the signaler being unambiguously associated with the reference stop and being activatable when the selected reference stop is selected;
   wherein a configuration of the associated optical signaler on the housing comprises one or more of the following additional designs: direction, size, shape.

5. The distance-measuring device as recited in claim 1 wherein the reference stop is selectable by the user by activating or attaching the reference stop on the distance-measuring device.

6. The distance-measuring device as recited in claim 1 wherein the reference stop is selectable by the user by the operating and input array.

7. A distance-measuring device for contactless measurement of a distance to a target, comprising:
   a housing;
   a measurer utilizing an optical measuring beam and arranged in the housing, the measurer capable of measuring the distance to the target contactlessly;
   at least one reference stop arranged on the housing and selectable by the user in order to carry out the measurement;
   an operating and input array arranged on the housing and serving to operate the measurer; and
   a visual display arranged on the housing and coupled to the operating and input array to indicate an operating state and/or the measured distance from a selected reference stop of the at least one reference stop to the target,
   the housing having at least one optical signaler separate from the visual display, the signaler being unambiguously associated with the reference stop and being activatable when the selected reference stop is selected;
   wherein the housing has a plurality of reference stops selectable by the user for the measurement as well as a plurality of individual optical signalers, each of the individual optical signalers separately and unambiguously associated with one of the individual reference stops.

8. The distance-measuring device as recited in claim 7 wherein the plurality of reference stops comprises a reference stop integral with part of the housing.

9. The distance-measuring device as recited in claim 7 wherein the reference stop is connected to the housing.

10. The distance-measuring device as recited in claim 1 wherein the housing has at least one of: a front with a front reference stop; a top or bottom with a top or bottom reference stop reference stop; a side with a side reference stop; and a rear with a rear reference stop, one optical signaler of the at least one optical signaler separate from the visual display associated with each of the reference stops and activatable when the selected reference stop is selected.

11. The distance-measuring device as recited in claim 1 wherein the housing has a measuring extension connected or connectable to the housing, or a tripod having a reference stop on one side.

12. The distance-measuring device as recited in claim 1 wherein the optical signaler is in the form of a light source for purposes of emitting a light signal.

13. The distance-measuring device as recited in claim 12 wherein the light source is a light diode or a signal lamp.

14. The distance-measuring device as recited in claim 1 wherein the measuring apparatus comprises:
    a laser unit;
    a transmitting and receiving lens system;
    an optical transmitting path having an optical axis for purposes of emitting the measuring beam onto the target; and
    an optical receiving path having a further optical axis for purposes of receiving the measuring beam that is reflected and/or scattered by the target.

15. The distance-measuring device as recited in claim 14 wherein the measuring apparatus performs a runtime measurement.

16. The distance measuring apparatus as recited in claim 1 wherein the apparatus is in the form of a handheld device and the housing is configured for handheld use.

* * * * *